United States Patent [19]

Noda et al.

[11] Patent Number: 4,688,131

[45] Date of Patent: Aug. 18, 1987

[54] INFORMATION PROCESSING APPARATUS HAVING LOCKING MEANS PERMITTING READY DETACHMENT OF THE MAGNETIC DISK DRIVE ASSEMBLY

[75] Inventors: Yasushi Noda; Toshihiro Kitahara; Hiroshi Tsuyuguchi, all of Tokyo, Japan

[73] Assignee: Teac Corporation, Tokyo, Japan

[21] Appl. No.: 667,554

[22] Filed: Nov. 2, 1984

[30] Foreign Application Priority Data

Nov. 14, 1983 [JP] Japan .......................... 58-175884[U]

[51] Int. Cl.⁴ ...................... G11B 17/02; G11B 31/00; H05K 7/16
[52] U.S. Cl. .................................... 360/137; 361/391
[58] Field of Search .......................... 360/137, 97-99; 361/391; 312/242

[56] References Cited

U.S. PATENT DOCUMENTS 4,479,263 10/1984 Rosenfeldt et al. ................. 361/391
4,510,589 4/1985 Ito ........................................ 360/137

Primary Examiner—Robert S. Tupper
Attorney, Agent, or Firm—Woodcock Washburn Kurtz Mackiewicz & Norris

[57] ABSTRACT

An information processing apparatus such as a computer of the class for office and home use is disclosed which employs a magnetic disk cartridge as an information storage medium, together with a disk drive assembly for information transfer with the disk cartridge. The apparatus has a housing having defined therein a disk drive compartment, in which there is accommodated the disk drive assembly inclusive of its own enclosure having an entrance slot for the insertion of the disk cartridge.

5 Claims, 13 Drawing Figures

INFORMATION PROCESSING APPARATUS HAVING LOCKING MEANS PERMITTING READY DETACHMENT OF THE MAGNETIC DISK DRIVE ASSEMBLY

BACKGROUND OF THE INVENTION

Our invention relates to information processing apparatus such as computers in general and, in particular, to an information processing apparatus of the class employing a magnetic disk, commonly referred to as the floppy disk, as an information storage medium. Even more particularly, our invention concerns such an information processing apparatus having a readily detachable disk drive assembly for the recording and/or reproduction of information on and/or from a magnetic disk packaged in cartridge form.

Magnetic disks have won a widespread commercial acceptance as compact information storage media for information processing apparatus such as computers of the class for office and home use, word processors, etc. Devices known as disk drives are normally employed for information transfer with magnetic disks. The disk drive in general comprises a magnetic transducer head or heads for direct data transer with a magnetic disk, a drive mechanism for revolving the magnetic disk, and another drive mechanism for track to track accessing to the magnetic disk by the head or heads.

In information processing apparatus of the type in question, as heretofore constructed, one or more disk drives have been incorporated in or with the body of the information processing apparatus as more or less permanent appendages. Consequently, the detachment of the disk drive or drives from the body of the apparatus, as for inspection or repair purposes, has involved a highly troublesome and time consuming procedure. A typical known construction has required the removal of the housing from the apparatus preparatory to the disconnection and withdrawal of the disk drive or drives therefrom.

SUMMARY OF THE INVENTION

We have succeeded in eliminating the noted trouble heretofore encountered in the maintenance of disk drive or drives incorporated in or with an information processing apparatus of the kind under consideration.

Our invention may be summarized as an information processing apparatus comprising a housing having defined therein a disk drive compartment in which a disk drive assembly is to be mounted through a mounting aperture in the housing. Also included is a locking means for automatically locking the disk drive assembly in the disk drive compartment against withdrawal therefrom as the disk drive assembly becomes mounted therein. The locking means is accessible for tripping, so that the complete disk drive assembly is readily withdrawable from the disk drive compartment as for maintenance purposes.

The disk drive assembly can per se be of any known or suitable construction designed for information transfer with a magnetic disk cartridge. It has an enclosure of its own, with an entrance slot defined therein for the insertion of the disk cartridge. This entrance slot is of course exposed through the mounting aperture in the housing when the disk drive assembly is mounted in the disk drive compartment.

We recommend the tripping of the locking means through the entrance slot in the enclosure of the disk drive assembly, by any suitable tool or, as in a preferred embodiment disclosed herein, by a tripping device specifically designed for that purpose. In this manner, neither the information processing apparatus nor the disk drive assembly need be provided with any particular tripping means, so that the apparatus is not to become bulky in size or complex and expensive in construction by incorporating the teachings of our invention.

We will also disclose herein the mentioned tripping device in order to manifest the full advantages of our invention. The tripping device is to be inserted in the entrance slot of the disk drive assembly mounted in the disk drive compartment of the information processing apparatus. Then the locking means can be released by a simple manipulation of a handle built in the tripping device, allowing the immediate withdrawal of the complete disk drive assembly from the apparatus.

The above and other features and advantages of our invention and the manner of realizing them will become more apparent, and the invention itself will best be understood, from a study of the following description and appended claims, with reference had to the attached drawings showing the preferred embodiment of our invention.

DESCRIPTION OF THE PREFERRED EMBODIMENT

Figure 1:
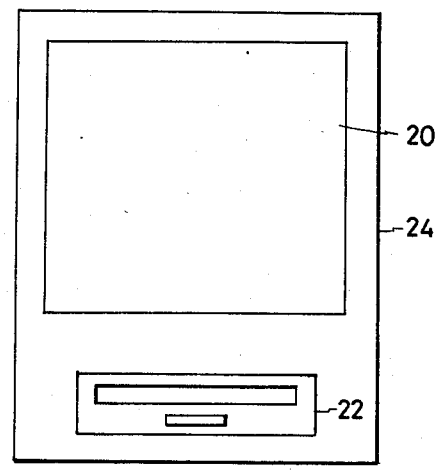
FIG. 1 is a front elevation of the display section of a word processor system exemplifying the information processing apparatus of our invention, the word processor display section having a disk drive assembly mounted therein in accordance with the teachings of our invention.

We will now describe in detail the information processing apparatus of our invention as typified by a word processor. We have illustrated in FIG. 1 the display section of the work processor, comprising a cathode ray tube display 20 and, thereunder, a disk drive assembly 22 accommodated in a common housing 24. The disk drive assembly 22 is mounted in the word processor housing 24 in a readily detachable manner in accordance with the teachings of our invention.

Figure 2:
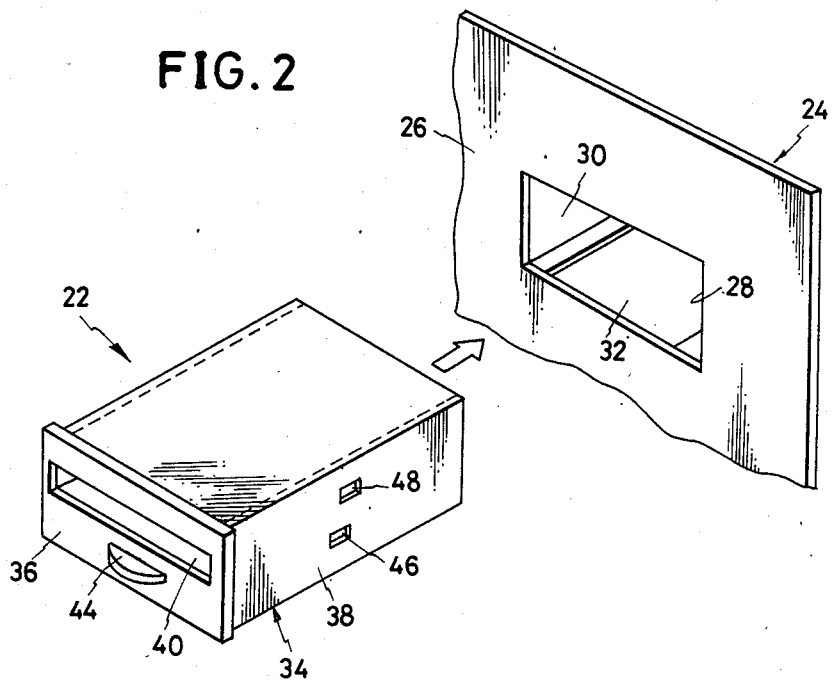
FIG. 2 is an enlarged perspective view showing part of the word processor display section of FIG. 1 and the disk drive assembly detached therefrom.

As better seen in FIG. 2, the word processor housing 24 has a front panel 26 in which there is formed a mounting aperture 28 of rectangular shape sized to suit the cross sectional size of the disk drive assembly 22. Within the word processor housing 24 are a pair of confronting, rimmed walls 30, one seen in FIG. 2, defining in combination a disk drive compartment 32 open to the mounting aperture 28. The disk drive assembly 22 is mounted in the disk drive compartment 32 through the mounting aperture 28 as indicated by the arrow.

FIG. 2 also illustrates the external construction of the disk drive assembly 22. It has a generally boxlike enclosure 34 including a front wall 36 and a pair of side walls 38, one seen in FIG. 2. The front wall 36 has an entrance slot 40 defined therein for loading and unloading a magnetic disk cartridge 42 (FIG. 3), into and from the disk drive assembly 22. Seen under the entrance slot 40 is an ejector button 44 to be manipulated for the ejection of the loaded disk cartridge 42. Each side wall 38 has first 46 and second 48 openings formed therein approximately centrally of its front to rear depth dimension, with the two openings being vertically spaced from each other.

Figure 3:
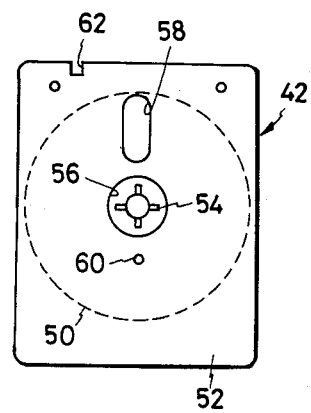
FIG. 3 is a plan view of the magnetic disk cartridge for use with the disk drive assembly of FIGS. 1 and 2.

With reference to FIG. 3, the magnetic disk cartridge 42 illustrated therein is of the known type having a magnetic disk 50 with a diameter of three inches (76 millimeters) housed in a rigid envelope 52. The magnetic disk 50 has a plastic hub 54 attached centrally thereto, which hub is exposed through a central aperture 56 in each side of the envelope 52. This envelope has also formed therein an elliptical aperture 58 to expose a radial portion of the magnetic disk 50 for information transfer engagement with a magnetic transducer head to be presented subsequently. The aperture 58 is normally closed by a shutter, now shown, which is to be opened as the disk cartridge 42 is loaded in the disk drive assembly 22. Further formed in the envelope 52 are a hole 60 located eccentrically of the magnetic disk 50 for register with an index hole defined therein, and a peripheral notch 62 for use in discriminating between the opposite sides of the disk cartridge 42.

Figure 4:
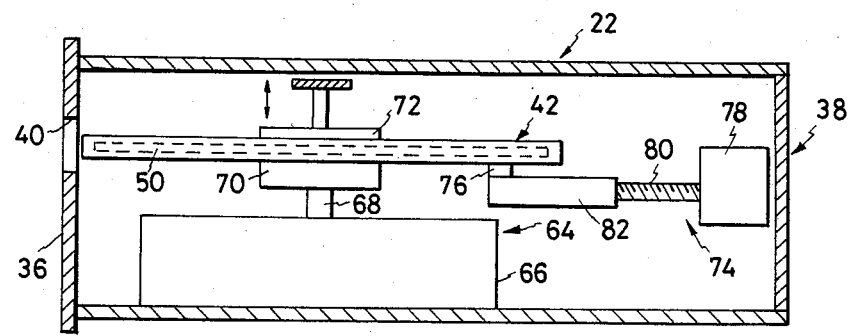
FIG. 4 is a still more enlarged vertical section through the disk drive assembly of FIG. 2.

FIG. 4 diagrammatically illustrates the internal configuration of the disk drive assembly 22 designed specifically for use with the three inch disk cartridge 42 of FIG. 3. The noted boxlike enclosure 38 of the disk drive assembly 22 has mounted therein a disk drive mechanism 64 including an electric motor 66 having a spindle 68 extending upwardly therefrom and terminating in a rotary disk mount 70. Disposed over the rotary disk mount 70 is a rotary clamp 72 movable into and out of engagement with the disk mount. The clamp 72 is normally held out of engagement with the disk mount 70 to allow the disk cartridge 42 to be loaded in and unloaded from the disk drive assembly 22 through the entrance slot 40 in the front panel 36 of its enclosure 38. When the disk cartridge 42 is correctly positioned as shown, the clamp 72 is lowered to engage the hub 54 of the magnetic disk 50 against the disk mount 70, in order that the disk may be revolved within the envelope 52 by the disk drive motor 64.

The enclosure 38 of the disk drive assembly 22 has also mounted therein a radial feed mechanism 74 for feeding a magnetic transducer head 76 radially of the magnetic disk 50 for track to track accessing through the elliptical aperture 58 in the disk cartridge envelope 52. The radial feed mechanism 74 includes an electric motor 78 of the stepping type. The rotation of this stepping motor is translated into the linear motion of the magnetic head 76 by a rotary to linear converter herein shown to comprise a lead screw 80 connecting the stepping motor to a carriage 82 having the magnetic head 76 mounted thereon.

The above explained internal construction of the disk drive assembly 22 has been well known in the art, and therein lies no feature of our invention. Our invention specifically proposes means for mounting and locking the disk drive assembly 22 to an information processing apparatus such as the word processor display section of FIG. 1 in a readily detachable manner, as discussed in more detail hereafter.

Figure 5:
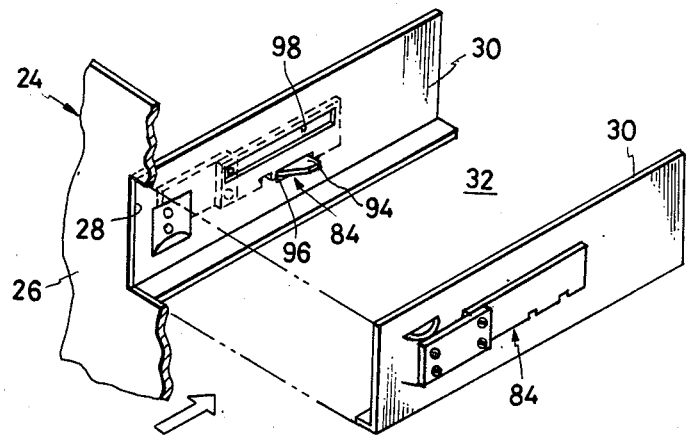
FIG. 5 is a fragmentary perspective view showing means for defining the disk drive compartment in the word processor display section of FIG. 1, and a pair of locking mechanisms on the defining means for locking the disk drive assembly in the disk drive compartment.

In FIG. 5 we have shown a pair of locking mechanisms 84 mounted respectively to the pair of confronting walls 30 bounding the disk drive compartment 32 within the word processor housing 24. The locking mechanisms 84 act conjointly to automatically lock the disk drive assembly 22 in the disk drive compartment 32 upon mounting of the disk drive assembly therein through the mounting aperture 28 in the front panel 26 of the word processor housing 24. It will also be noted from FIG. 5 that the disk drive compartment walls 30 extend inwardly of the word processor housing 24 from the mounting aperture 28 and are spaced from each other a distance approximately equal to the width of the enclosure 34 of the disk drive assembly 22, so that the latter may be slid into and out of the disk drive compartment 32.

The pair of locking mechanisms 84 are of identical make. We will therefore describe only one of them in detail, with the understanding that the same description applies to the other.

Figure 6:
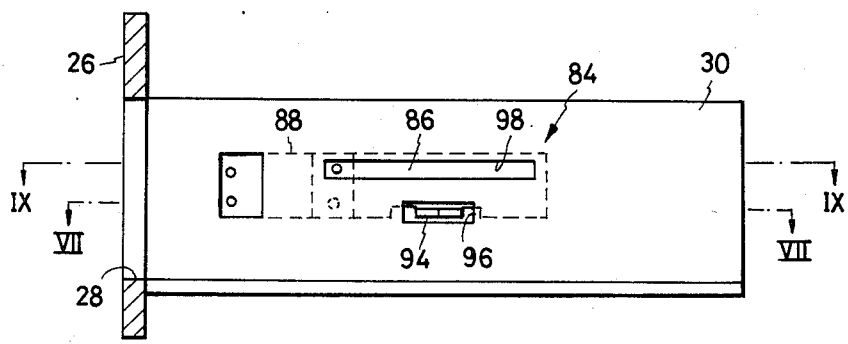
FIG. 6 is a side elevation of the arrangement of FIG. 4, showing one of the locking mechanisms in particular.
Figure 7:
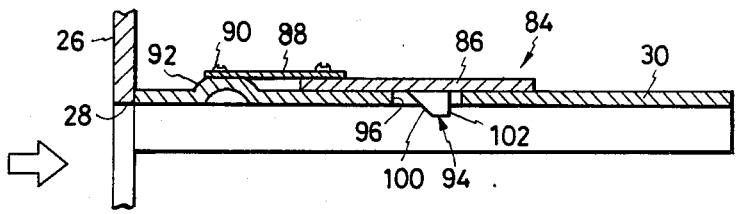
FIG. 7 is a horizontal section taken along the line VII—VII of FIG. 6 and also showing one of the locking mechanisms in particular.

As will be seen also from FIGS. 6 and 7, the representative locking mechanism 84 illustrated therein comprises a locking lever 86 mounted via a cantilever spring 88 on the outer surface of one of the disk drive compartment walls 30, the outer wall surface being the one which is opposite to its surface defining the disk drive compartment 32. The cantilever spring 88 is fastened at 90 to a projection 92 on the disk drive compartment wall 30 and functions to bias the locking lever 86 toward the disk drive compartment 32, normally holding the locking lever flatwise against the outer surface of the wall 30. The locking lever 86 has a pawl 94 formed in one piece therewith and bent right angularly therefrom and normally extending through a first opening 96 in the wall 30 into the disk drive compartment 32. The wall 30 has formed therein a second opening 98 which overlies the first opening 96 and which is elongated in the front to rear depth direction of the disk drive compartment 32. The second opening 98 is intended to expose part of the locking lever 86 to the disk drive compartment 32 for the purpose of tripping, as become more fully apparent subsequently.

The pawl 94 of the locking lever 86 is of approximately triangular shape, having a sloping edge 100 and a nonsloping edge 102. Disposed toward the mounting aperture 28, the sloping edge 100 of the locking lever pawl 94 is angled less than 90 degrees with respect to the disk drive compartment wall 30, as best seen in FIG. 7. The nonsloping edge 102, on the other hand, is at an angle of 90 degrees with the wall 30.

Figure 8:
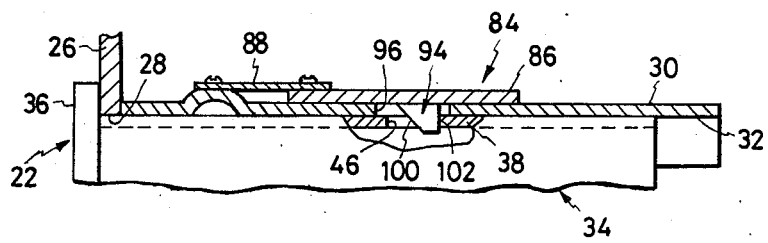
FIG. 8 is a view similar to FIG. 6 except that the disk drive assembly is mounted in position in the disk drive compartment and locked by the locking mechanism.
Figure 9:
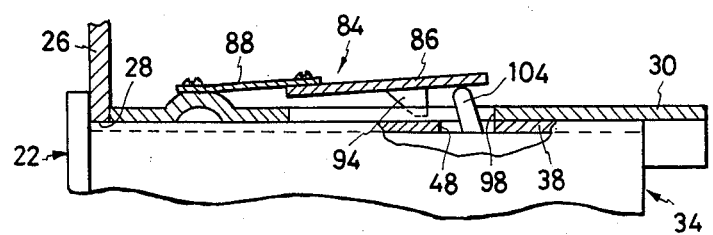
FIG. 9 is a horizontal section taken along the line IX—IX in FIG. 6, the view being somewhat similar to FIG. 8 in that one of the locking mechanisms is shown together with the disk drive assembly mounted in position in the disk drive compartment, but being explanatory of the way in which the locking mechanism is tripped.

With reference to FIG. 8, the first opening 46 in each side wall 38 of the disk drive assembly enclosure 34 comes into register with the first opening 96 in the disk drive compartment wall 30 when the disk drive assembly 22 is correctly mounted in the disk drive compartment 32. FIG. 9 further indicates that the second opening 48 in each side wall 38 of the disk drive assembly enclosure 34 comes into register with the second opening 98 in the disk drive compartment wall 30 when the disk drive assembly 22 is mounted in the disk drive compartment 32.

As will be understood by referring back to FIG. 2, the disk drive assembly 22 is to be inserted in the disk drive compartment 32 through the mounting aperture 28 in the front panel 26 of the word processor housing 24, with the slotted front wall 36 of the disk drive assembly enclosure 34 at the trailing end. So inserted, the disk drive assembly 22 will slide along the pair of confronting, rimmed walls 30 of the disk drive compartment 32, until the leading ends of the pair of side walls 38 of the disk drive assembly enclosure 34 come into engagement with the locking lever pawls 94 of the pair of locking mechanisms 84, respectively. Thereupon, sliding over the sloping edges 100 of the locking lever pawls 94, the disk drive assembly enclosure 34 will force the locking levers 86 away from the respective drive compartment walls 30 against the forces of the cantilever springs 88. Thus the disk drive assembly 22 can be pushed further into the disk drive compartment 32 without being impeded by the locking lever pawls 94.

Upon full insertion of the disk drive assembly 22 in the disk drive compartment 32, as pictured in FIG. 8, the first openings 46 in the side walls 38 of the disk drive assembly enclosure 34 will come into register with the first openings 96 in the drive compartment walls 30. Accordingly, the locking lever pawls 94 will become engaged in the first openings 46 in the disk drive assembly enclosure 34 under the influence of the cantilever springs 88 acting on the locking levers 86. Then the disk drive assembly 22 will no longer be withdrawable from the disk drive compartment 32 as the nonsloping edges 102 engage the side walls 38 of the disk drive assembly enclosure 34.

It will have been understood that the pair of locking mechanisms 84 automatically lock up the disk drive assembly 22 simply as the latter is fully inserted in the disk drive compartment 32 against the forces of the cantilever springs 88. The disk drive assembly 22 is to be put to use for information transfer with the magnetic disk cartridge 42 by being thus mounted and locked in the disk drive compartment 32 within the word processor housing 24. The manner of operations of the disk drive assembly 22 can be conventional and falls outside the purview of our invention, so that we will omit the operational description of the disk drive assembly.

The need may arise during the use of the word processor system for the detachment of the disk drive assembly 22 from within its housing 24, as for maintenance purposes. The unlocking of the disk drive assembly 22 and its withdrawal from the disk drive compartment 32 are no less easy than its mounting, as we will explain in detail hereinbelow.

The second openings 48 in the side walls 38 of the disk drive assembly enclosure 34 and the second openings 98 in the disk drive compartment walls 30 are both approximately on a level with the entrance slot 40 in the front wall 36 of the disk drive assembly enclosure 34 and are positioned for ready access through the entrance slot. A suitable tool or special tripping device may therefore be inserted into the entrance slot 40 of the disk drive assembly 34 and further into and through the registered second openings 48 of the disk drive assembly and second openings 98 in the disk drive compartment walls 30. Then, as depicted in FIG. 9, the pair of locking levers 86 may be forced apart from the disk drive compartment walls 30 against the forces of the cantilever springs 88, thereby disengaging their pawls 94 out of the first openings 46 in the side walls 38 of the disk drive assembly enclosure 34. Seen at 104 in FIG. 9 is an offset tip of a tripping lever forming a part of a tripping device 106, illustrated in FIGS. 10 through 13, which has been designed exclusively for unlocking the disk drive assembly 22.

Figure 10:
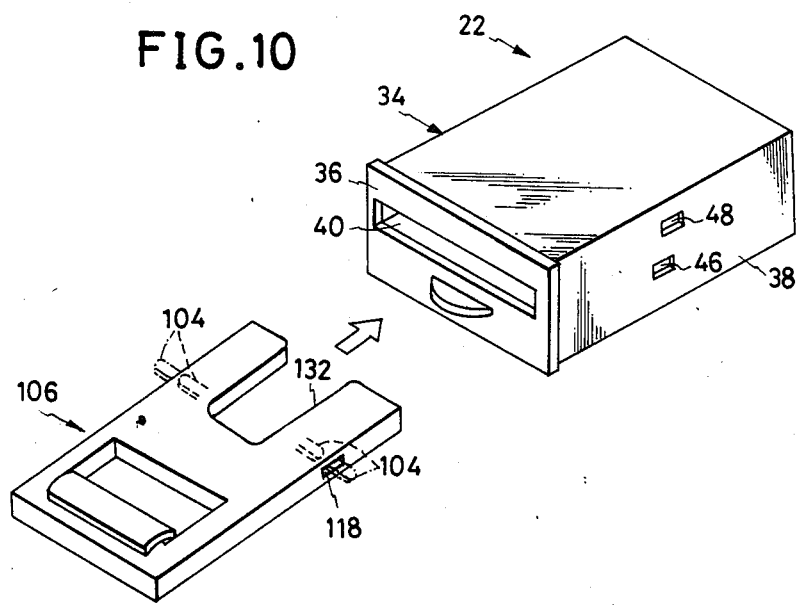
FIG. 10 is a perspective view of the disk drive assembly and the tripping device for unlocking the disk drive assembly from the disk drive compartment.
Figure 11:
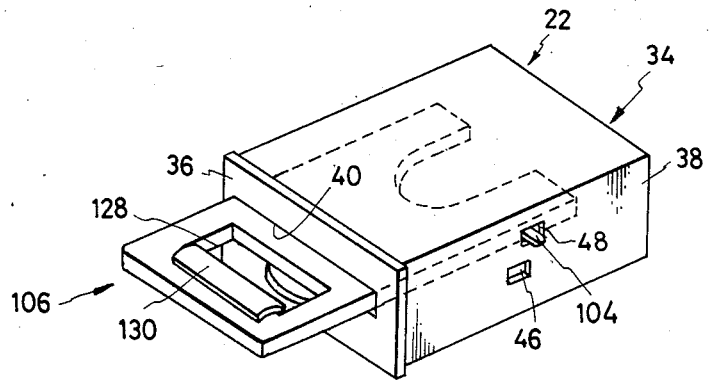
FIG. 11 is a view similar to FIG. 10 except that the tripping device is shown inserted in the disk drive assembly.

As will be understood from FIGS. 10 and 11, the tripping device 106 is cross sectionally sized and shaped to fit in the entrance slot 40 of the disk drive assembly 22; that is, the tripping device may be approximately equal in thickness and width to the magnetic disk cartridge 42 of FIG. 3. Thus, just like the disk cartridge 42, the tripping device 106 may be inserted in the entrance slot 40 of the disk drive assembly 22, mounted in the disk drive compartment 32 within the word processor housing 24, for unlocking the same.

Figure 12:
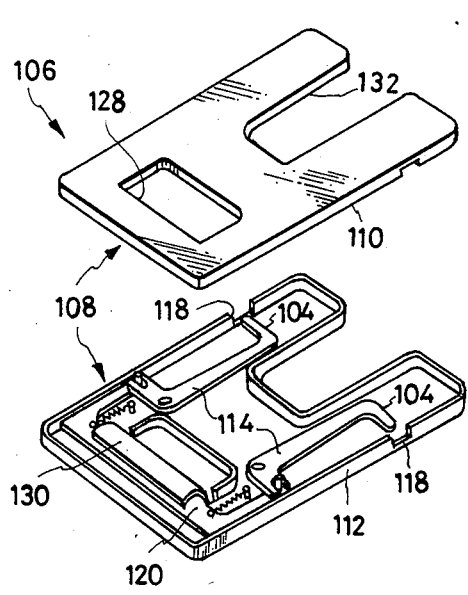
FIG. 12 is a perspective view showing the top half of the casing of the tripping device removed from its bottom half to reveal the inner details of the tripping device.
Figure 13:
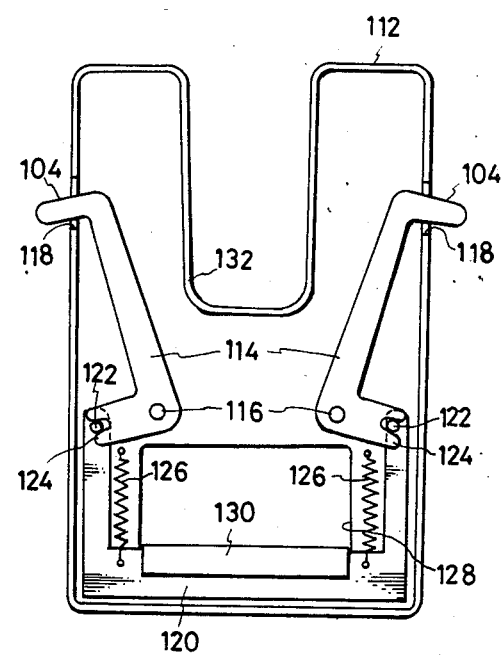
FIG. 13 is an enlarged plan view of the bottom half of the casing of the tripping device, shown together with the working parts mounted therein.

FIGS. 12 and 13 illustrate details in the construction of the tripping device 106. It has a casing 108 split into a top half 110 and a bottom half 112. The casing bottom half 112 has a pair of tripping levers 114 pinned at 116 thereto for pivotal motion about respective axes normal to the casing halves 110 and 112. The tripping levers 114 are each U shaped, including the noted offset tip 104, and are arranged in bilateral symmetry with respect to the longitudinal axis of the casing 108. The tripping levers 114 are each pivotable between a retracted position of FIG. 12 and a working position of FIG. 13. When in the retracted position, the tripping levers 114 are thoroughly held within the casing 108. In the working position, then, the tripping levers 114 have their offset tips 104 projecting out of the casing 108 through a pair of holes 118 in its opposite sides for tripping the locking mechanisms 84 on the disk drive compartment walls 30 as in FIG. 9.

In order to cause such pivotal motion of the tripping levers 114 between the retracted and working positions, we provide a U shaped handle 120 slidably mounted in the casing bottom half 112 for linear reciprocation in the front to rear depth direction of the tripping device 106. The handle 120 has a pair of pins 122 rigidly mounted on its opposite ends for sliding engagement respectively in notches 124 cut in those ends of the tripping levers 114 which are away from their offset tips 104. A pair of helical tension springs 126 are connected between casing bottom half 112 and handle 120 to bias the latter rearwardly, with the result that the tripping levers 114 are normally held retracted as in FIG. 12. The casing 108 has a rectangular opening 128 formed therethrough for the insertion of a hand in manipulating the handle 120. Formed integral with the handle 120, a grip 130 of approximately semi-cylindrical shape is exposed through the opening 128 so as to be manually pressed against the forces of the tension springs 126. A recess 132 in the casing 108 is intended to expedite the insertion of the tripping device 106 in the entrance slot 40 of the disk drive assembly 22.

Such being the construction of the tripping device 106, it may be inserted, with its recessed end foremost as in FIG. 10, in the entrance slot 40 of the disk drive assembly 22 which has been mounted and locked in the disk drive compartment 32 as in FIG. 8. The pair of tripping levers 114 of the tripping device 106 are of course held in the retracted position of FIG. 12 by the tension springs 126.

FIG. 11 shows the tripping device 106 fully inserted in the entrance slot 40. Then, perhaps with all but the thumb of the fingers of one hand inserted in the rectangular opening 128 in the tripping device casing 108, the operator may grasp the grip 130 of the handle 120, thereby causing the pair of tripping levers 114 to pivot away from each other to the working position of FIG. 13 in opposition to the forces of the tension springs 126. Thereupon the offset tips 104 of the tripping levers 114 will project out of the holes 118 in the opposite sides of the tripping device casing 108 and, as shown in FIG. 9, further out of the second openings 48 in the side walls 38 of the disk drive assembly enclosure 34 and the second openings 98 in the disk drive compartment walls 30. The projecting tips 104 of the tripping levers 114 will move the locking levers 86 of the locking mechanisms 84 away from the respective disk drive compartment walls 30 against the forces of the cantilever springs 88 thereby causing disengagement of their pawls 94 from the first openings 46 of the disk drive assembly 22. The disk drive assembly 22 has now been unlocked.

Then, with the offset tips 104 of the tripping levers 114 held projecting out of the second openings 98 in the disk drive compartment walls 30, the disk drive assembly 22 together with the tripping device 106 inserted therein may be pulled outwardly of the disk drive compartment 32, until the first openings 46 of the disk drive assembly 22 travel out of the paths of the locking lever pawls 94. We have elongated the second openings 98 in the disk drive compartment walls 38 in the direction in which the disk drive assembly is inserted in and withdrawn from the disk drive compartment 32, in order to allow such partial withdrawal of the disk drive assembly 22 and tripping device 106 with the tripping lever tips 104 projecting outwardly therethrough. Now the handle 120 of the tripping device 106 may be released, and the disk drive assembly 22 may be pulled out of the disk drive compartment 32 together with the tripping device 106.

Although we have shown and described our invention in terms of but one embodiment thereof, we recognize that this embodiment is susceptible to a variety of modifications or alterations within the usual knowledge of one skilled in the art. The following, then, is a brief list of such possible modifications or alterations:

1. Our invention may be applied to information processing apparatus other than a word processor, including an apparatus incorporating two or mroe disk drive assemblies.

2. In each locking mechanism 84, the locking lever 86 with its pawl 94 could be integral with the cantilever spring 88; that is, a cantilever spring of appropriate length could be used as the locking lever, which lever would then be self biased to have its pawl normally projecting into the disk drive compartment 30 through one of its confronting walls 30.

3. Coil springs or the like could be employed to cause linear displacement of the locking levers 86 or equivalents thereof in a direction at right angles with the disk drive compartment walls 30.

4. Spring biased locking levers or equivalent means could be mounted to the enclosure 34 of the disk drive assembly 22, instead of to the disk drive compartment walls 30 as in the illustrated embodiment, for locking engagement with the disk drive compartment walls.

5. The disk drive compartment 32 could be defined by an open ended boxlike wall arrangement.

6. The disk drive assembly 22 need not have the boxlike enclosure 34 but may have its internal working components exposed as it is accommodated in the disk drive compartment 32 in use. Thus, for instance, the disk drive assembly 22 may have only the front wall 36 with the entrance slot 40 defined therein, the pair of side walls 38 having the first 46 and second 48 openings cut therein, and the bottom wall.

7. The disk drive assembly 22 may be modified for use with magnetic disk cartridges other than the three inch disk cartridge 42 of FIG. 3, such as those having disks with diameters of 3.5 inches, 4.0 inches, etc.

8. The disk drive assembly 22 may further be modified to include two magnetic transducer heads, disposed one on each side of the disk cartridge 42, for data transfer with the opposite surfaces of the magnetic disk 50. In short, the internal configuration of the disk drive assembly 22 is arbitrary provided with it is equipped for information transfer with a magnetic disk cartridge.

All these and other changes or modifications within the usual knowledge of the specialists are understood to fall within the scope of our invention.

We claim:

1. In an information processing apparatus employing a magnetic disk cartridge as an information storage medium, in combination:
   (a) a disk drive assembly for the transfer of information with the magnetic disk cartridge, the disk drive assembly including an enclosure having defined therein an entrance slot through which the disk cartridge is to be inserted into the enclosure for information transfer;
   (b) a housing having a mounting aperture defined therein;
   (c) wall means within the housing for defining therein a disk drive compartment open to the mounting aperture in the housing, the disk drive assembly being adapted to be mounted in the disk drive compartment through the mounting aperture in the housing, the entrance slot in the enclosure of the thus mounted disk drive assembly being exposed through the mounting aperture in the housing; and
   (d) locking means acting between the disk drive assembly and the wall means for automatically locking the disk drive assembly into the disk drive compartment against detachment from the housing as the disk drive assembly is mounted in the disk drive compartment through the mounting aperture in the housing, the locking means including a locking member on the wall means biased into engagement with the enclosure of the disk drive assembly in the disk drive compartment, said locking means being adapted to receive a force opposing the biased engagement of the locking member and the disk drive assembly to disengage the locking member from the disk drive assembly, said force being applied through the entrance slot of the disk drive assembly, thereby disengaging the disk drive assembly from the wall means for the ready withdrawal of the disk drive assembly from the disk drive compartment as required for maintenance or other purposes.

2. In an information processing apparatus employing a magnetic disk cartridge as an information storage medium, in combination:
  (a) a disk drive assembly for the transfer of information with the magnetic disk cartridge, the disk drive assembly having an enclosure including both a front a wall and a pair of side walls, the front wall of the enclosure having defined therein an entrance slot through with the disk cartridge is to be inserted into the enclosure for information transfer, and at least either of the pair of the side walls of the enclosure having a first and a second opening defined therein, at least the second opening being accessible through the entrance slot in the front wall of the enclosure;
  (b) a housing having a mounted aperture defined therein;
  (c) wall means comprising a pair of confronting walls within the housing for defining therein a disk drive compartment open to the mounting aperture in the housing, the disk drive assembly being adapted to be mounted in the disk drive compartment through the mounting aperture in the housing, the entrance slot in the front wall of the enclosure of the thus mounted disk drive assembly being exposed through the mounting aperture in the housing; and
  (d) locking means mounted on at least either of the confronting walls of the wall means for automatically locking the disk drive assembly in the disk drive compartment against detachment from the housing by engaging in the first opening in at least either side wall of the enclosure of the disk drive assembly as the disk drive assembly is mounted in the disk drive compartment through the mounting aperture in the housing, the locking means being adapted to be disengaged from the first opening by exertion of a force through the second opening in at least either side wall of the enclosure of the disk drive assembly mounted in the disk drive compartment, said force causing the wall means to disengage the disk drive assembly by forcing the locking means to disengage the first opening in at least either side wall of the enclosure of the disk drive assembly, whereby the disk drive assembly is readily withdrawable from the disk drive compartment as required for maintenance or other purposes.

3. The information processing apparatus of claim 2 wherein the pair of side walls of the enclosure of the disk drive assembly have each the first and second openings defined therein, and wherein the locking means comprises:
  (a) a pair of locking members mounted one on each of the confronting walls of the wall means for movement into and out of engagement respectively in the first openings in the side walls of the enclosure of the disk drive assembly; and
  (b) resilient means for biasing the locking members into engagement in the first openings in the side walls the enclosure of the disk drive assembly;
  (c) the locking members being adapted to be moved out of engagement in the first openings against the bias of the resilient means through the second openings in the side walls of the enclosure of the disk drive assembly.

4. The information processing apparatus of claim 3 wherein each locking member of the locking means is mounted on that surface of each of the confronting walls of the wall means which is opposite to its surface bounding the disk drive compartment, wherein each locking member has a pawl movable into and out of engagement in the first opening in one side wall of the enclosure of the disk drive assembly through a first opening in one of the confronting walls of the wall means, and wherein each of the confronting walls of the wall means having a second opening formed therein for use in tripping the locking means.

5. The information processing apparatus of claim 4 wherein the second opening in each of the confronting walls of the wall means is elongated in the direction in which the disk drive assembly is inserted in and withdrawn from the disk drive compartment.

* * * * *